United States Patent
Huang (10) Patent No.: US 12,450,070 B1
(45) Date of Patent: Oct. 21, 2025

(54) ENABLING HIGH-PERFORMANCE SCALABLE MATRIX EXTENSION (SME) INSTRUCTION ISSUE IN PROCESSOR DEVICES

(71) Applicant: QUALCOMM Incorporated, San Diego, CA (US)

(72) Inventor: Yiran Huang, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/888,365

(22) Filed: Sep. 18, 2024

(51) Int. Cl.
  *G06F 9/38* (2018.01)
(52) U.S. Cl.
  CPC .......... *G06F 9/3838* (2013.01); *G06F 9/3836* (2013.01); *G06F 9/384* (2013.01)
(58) Field of Classification Search
  CPC ....... G06F 9/3838; G06F 9/3836; G06F 9/384
  See application file for complete search history.

(56) References Cited

U.S. PATENT DOCUMENTS

| | | | |
|---|---|---|---|
| 2007/0038848 A1* | 2/2007 | Gschwind | G06F 9/30181 712/225 |
| 2014/0047218 A1* | 2/2014 | Jackson | G06F 9/384 712/217 |
| 2016/0188392 A1* | 6/2016 | Baghsorkhi | G06F 9/3834 714/819 |
| 2023/0289185 A1* | 9/2023 | Sole | G06F 9/30038 |
| 2024/0403050 A1* | 12/2024 | Randall | G06F 9/30098 |
| 2025/0117220 A1* | 4/2025 | Hurkat | G06F 9/3001 |

* cited by examiner

Primary Examiner — Shawn Doman
(74) Attorney, Agent, or Firm — W&T (57) ABSTRACT

Enabling high-performance Scalable Matrix Extension (SME) instruction issue in processor devices is disclosed herein. In some aspects, a processor device comprises a reservation station circuit configured to perform, during a first phase, a reduced-precision vector accumulator (ZA) tracking operation on micro-ops for which corresponding vector (Z) registers and corresponding predicate (P) registers are ready. Based on the reduced-precision ZA tracking operation, the reservation station circuit selects a first micro-op and a second micro-op having no Read-After-Write (RAW) hazard with respect to the ZA registers. During a subsequent second phase, the reservation station circuit performs a full-precision ZA tracking operation on the first micro-op and the second micro-op, and selects one as a micro-op for issue for which the full-precision ZA tracking operation indicates no RAW hazard exists with respect to the ZA registers. The reservation station circuit then issues the selected micro-op for execution.

20 Claims, 4 Drawing Sheets

FIG. 3

ENABLING HIGH-PERFORMANCE SCALABLE MATRIX EXTENSION (SME) INSTRUCTION ISSUE IN PROCESSOR DEVICES

TECHNICAL FIELD

The technology of the disclosure relates generally to execution of Scalable Matrix Extension (SME) instructions in processor devices, and, in particular, to hazard resolution for SME instruction micro-operations (micro-ops).

BACKGROUND

Scalable Matrix Extension (SME) is an architectural extension to the ARM architecture that is intended to provide enhanced support for matrix operations, particularly in the context of artificial intelligence (AI), machine learning (ML), and high-performance computing workloads. SME version 1 (SME1) introduces specialized instructions and registers designed to optimize matrix operations to enable more efficient data handling and parallel processing. For example, SME1 provides vector (Z) registers that are configured to hold vectors of data for computation, and also provides predicate (P) registers that are configured to control the masking and selection of elements to be used in a given operation. The use of Z registers allows efficient handling of large datasets and simultaneous operations on multiple data points, while the use of P registers enables conditional processing and improves efficiency when working with sparse or irregular data.

SME1 also provides a vector accumulator (ZA) that comprises ZA registers specialized for matrix accumulation tasks. The ZA registers are architecturally defined to be wider than conventional registers (e.g., 512 bits wide compared to conventional 32- or 64-bit-wide registers), and are also generally more numerous that conventional registers (e.g., 64 ZA registers compared to 16 conventional registers). Consequently, ZA register files tend to be larger physical structures relative to register files for Z registers, P registers, and conventional integer (X) registers. SME version 2 (SME2) builds upon the foundation of SME1 by introducing further matrix handling capabilities, including additional instructions for outer product accumulation and enhanced matrix multiplication operations. In particular, SME2 provides support for specialized for matrix accumulation tasks by allowing both consecutive and strided addressing patterns for accessing multiple ZA registers using a single instruction.

While renaming of Z registers and P registers is used in conventional SME processors, ZA register renaming is generally not feasible both because of area constraints, and also because one SME2 instruction may result in potentially hundreds of multiply and accumulate operations involving multiple ZA registers. This increases the difficulty of associating instruction execution results with particular ZA registers. Consequently, SME instructions generally are not issued out-of-order. However, it may be difficult to schedule and issue SME instruction in-order while maintaining high throughput, due to the complexity of detecting potential Read-After-Write (RAW) hazards on ZA registers.

SUMMARY OF THE DISCLOSURE

Aspects disclosed in the detailed description include enabling high-performance Scalable Matrix Extension (SME) instruction issue in processor devices. Related apparatus, methods, and computer-readable media are also disclosed. In this regard, in some exemplary aspects disclosed herein, a processor device includes a plurality of reservation station circuits that each store a corresponding plurality of micro-operations (micro-ops) (i.e., low-level instructions that together implement the functionality of an SME instruction). The processor device further includes a plurality of vector (Z) registers, a plurality of predicate (P) registers, and a vector accumulator (ZA) comprising a plurality of ZA registers. In exemplary operation, a reservation station of the processor device is configured to perform a two (2)-phase resolution of Read-After-Write (RAW) hazards that may arise with respect to the micro-ops and the ZA registers. During a first phase, the reservation station circuit performs a reduced-precision ZA tracking operation on each micro-op stored by the reservation station circuit for which corresponding Z registers and corresponding P registers are ready. The reduced-precision ZA tracking operation in some aspects may comprise, e.g., the reservation station determining whether each micro-op of the plurality of micro-ops corresponds to an SME version 1 (SME1) access pattern.

The reservation station circuit then selects a first micro-op and a second micro-op for which the reduced-precision ZA tracking operation indicates no RAW hazard exists with respect to the plurality of ZA registers. Selection of the first micro-op and the second micro-op may comprise, e.g., selecting an oldest micro-op for which a first Z register of the plurality of Z registers and a first P register of the plurality of P registers are ready, and a youngest micro-op for which a second Z register of the plurality of Z registers and a second P register of the plurality of P registers are ready as the second micro-op.

During a subsequent second phase, the reservation station circuit performs a full-precision ZA tracking operation on each of the first micro-op and the second micro-op. According to some aspects, performing the full-precision ZA tracking operation may comprise the reservation station circuit determining whether each ZA register of the plurality of ZA registers is ready (e.g. based on a plurality of counters corresponding to the plurality of ZA registers). The reservation station circuit then selects, based on the full-precision ZA tracking operation, one of the first micro-op and the second micro-op as a micro-op for issue for which the full-precision ZA tracking operation indicates no RAW hazard exists with respect to the plurality of ZA registers of the processor device. The reservation station circuit issues the micro-op for issue to an execution circuit of an instruction processing circuit of the processor device for execution. In some aspects, the reservation station circuit, subsequent to issuing the micro-op for issue to the execution circuit for execution, may update a counter of the plurality of counters.

In another aspect, a processor device is disclosed. The processor device comprises an instruction processing circuit that includes an execution circuit and a plurality of reservation station circuits each configured to store a corresponding plurality of micro-ops. The processor device further comprises a plurality of Z registers, a plurality of P registers, and a ZA comprising a plurality of ZA registers. Each reservation station circuit of the plurality of reservation station circuits is configured to perform, during a first phase, a reduced-precision ZA tracking operation on each micro-op of the plurality of micro-ops for which corresponding Z registers of the plurality of Z registers and corresponding P registers of the plurality of P registers are ready. The reservation station circuit is further configured to select, during the first phase based on the reduced-precision ZA tracking operation, a first micro-op and a second micro-op for which the reduced-precision ZA tracking operation indicates no RAW hazard exists with respect to the plurality of ZA registers. The reservation station circuit is also configured to perform, during a subsequent second phase, a full-precision ZA tracking operation on each of the first micro-op and the second micro-op. The reservation station circuit is additionally configured to select, during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers of the processor device. The reservation station circuit is further configured to issue, during the subsequent second phase, the micro-op for issue to an execution circuit of the instruction processing circuit for execution.

In another aspect, a processor device is disclosed. The processor device comprises means for performing, during a first phase, a reduced-precision ZA tracking operation on each micro-op of a plurality of micro-ops, stored by a reservation station circuit of the processor device, for which corresponding Z registers of a plurality of Z registers of the processor device and corresponding P registers of a plurality of P registers of the processor device are ready. The processor device further comprises means for selecting, during the first phase based on the reduced-precision ZA tracking operation, a first micro-op and a second micro-op for which the reduced-precision ZA tracking operation indicates no RAW hazard exists with respect to a plurality of ZA registers of the processor device. The processor device also comprises means for performing, during a subsequent second phase, a full-precision ZA tracking operation on each of the first micro-op and the second micro-op. The processor device additionally comprises means for selecting, during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers of the processor device. The processor device further comprises means for issuing, during the subsequent second phase, the micro-op for issue to an execution circuit of an instruction processing circuit of the processor device for execution.

In another aspect, a method for enabling high-performance SME instruction issue in processor devices is disclosed. The method comprises performing, by a reservation station circuit of a processor device during a first phase, a reduced-precision ZA tracking operation on each micro-op of a plurality of micro-ops, stored by the reservation station circuit, for which corresponding Z registers of a plurality of Z registers of the processor device and corresponding predicate (P) registers of a plurality of P registers of the processor device are ready. The method further comprises selecting, by the reservation station circuit during the first phase based on the reduced-precision ZA tracking operation, a first micro-op and a second micro-op for which the reduced-precision ZA tracking operation indicates no RAW hazard exists with respect to a plurality of ZA registers of the processor device. The method also comprises performing, by the reservation station circuit during a subsequent second phase, a full-precision ZA tracking operation on each of the first micro-op and the second micro-op. The method additionally comprises selecting, by the reservation station circuit during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers of the processor device. The method further comprises issuing, by the reservation station circuit during the subsequent second phase, the micro-op for issue to an execution circuit of an instruction processing circuit of the processor device for execution.

In another aspect, a non-transitory computer-readable medium is disclosed. The non-transitory computer-readable medium stores computer-executable instructions that, when executed, cause a processor device to perform, during a first phase, a reduced-precision ZA tracking operation on each micro-op of a plurality of micro-ops, stored in a reservation station circuit of the processor device, for which corresponding Z registers of a plurality of Z registers of the processor device and corresponding P registers of a plurality of P registers of the processor device are ready. The computer-executable instructions further cause the processor device to select, during the first phase based on the reduced-precision ZA tracking operation, a first micro-op and a second micro-op for which the reduced-precision ZA tracking operation indicates no RAW hazard exists with respect to a plurality of ZA registers of the processor device. The computer-executable instructions also cause the processor device to perform, during a subsequent second phase, a full-precision ZA tracking operation on each of the first micro-op and the second micro-op. The computer-executable instructions additionally cause the processor device to select, during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers of the processor device. The computer-executable instructions further cause the processor device to issue, during the subsequent second phase, the micro-op for issue to an execution circuit of an instruction processing circuit of the processor device for execution.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise expressly indicated.

Aspects disclosed in the detailed description include enabling high-performance Scalable Matrix Extension (SME) instruction issue in processor devices. Related apparatus, methods, and computer-readable media are also disclosed. In this regard, in some exemplary aspects disclosed herein, a processor device includes a plurality of reservation station circuits that each store a corresponding plurality of micro-operations (micro-ops) (i.e., low-level instructions that together implement the functionality of an SME instruction). The processor device further includes a plurality of vector (Z) registers, a plurality of predicate (P) registers, and a vector accumulator (ZA) comprising a plurality of ZA registers. In exemplary operation, a reservation station of the processor device is configured to perform a two (2)-phase resolution of Read-After-Write (RAW) hazards that may arise with respect to the micro-ops and the ZA registers. During a first phase, the reservation station circuit performs a reduced-precision ZA tracking operation on each micro-op stored by the reservation station circuit for which corresponding Z registers and corresponding P registers are ready. The reduced-precision ZA tracking operation in some aspects may comprise, e.g., the reservation station determining whether each micro-op of the plurality of micro-ops corresponds to an SME version 1 (SME1) access pattern.

The reservation station circuit then selects a first micro-op and a second micro-op for which the reduced-precision ZA tracking operation indicates no RAW hazard exists with respect to the plurality of ZA registers. Selection of the first micro-op and the second micro-op may comprise, e.g., selecting an oldest micro-op for which a first Z register of the plurality of Z registers and a first P register of the plurality of P registers are ready, and a youngest micro-op for which a second Z register of the plurality of Z registers and a second P register of the plurality of P registers are ready as the second micro-op.

During a subsequent second phase, the reservation station circuit performs a full-precision ZA tracking operation on each of the first micro-op and the second micro-op. According to some aspects, performing the full-precision ZA tracking operation may comprise the reservation station circuit determining whether each ZA register of the plurality of ZA registers is ready (e.g. based on a plurality of counters corresponding to the plurality of ZA registers). The reservation station circuit then selects, based on the full-precision ZA tracking operation, one of the first micro-op and the second micro-op as a micro-op for issue for which the full-precision ZA tracking operation indicates no RAW hazard exists with respect to the plurality of ZA registers of the processor device. The reservation station circuit issues the micro-op for issue to an execution circuit of an instruction processing circuit of the processor device for execution. In some aspects, the reservation station circuit, subsequent to issuing the micro-op for issue to the execution circuit for execution, may update a counter of the plurality of counters.

Figure 1:
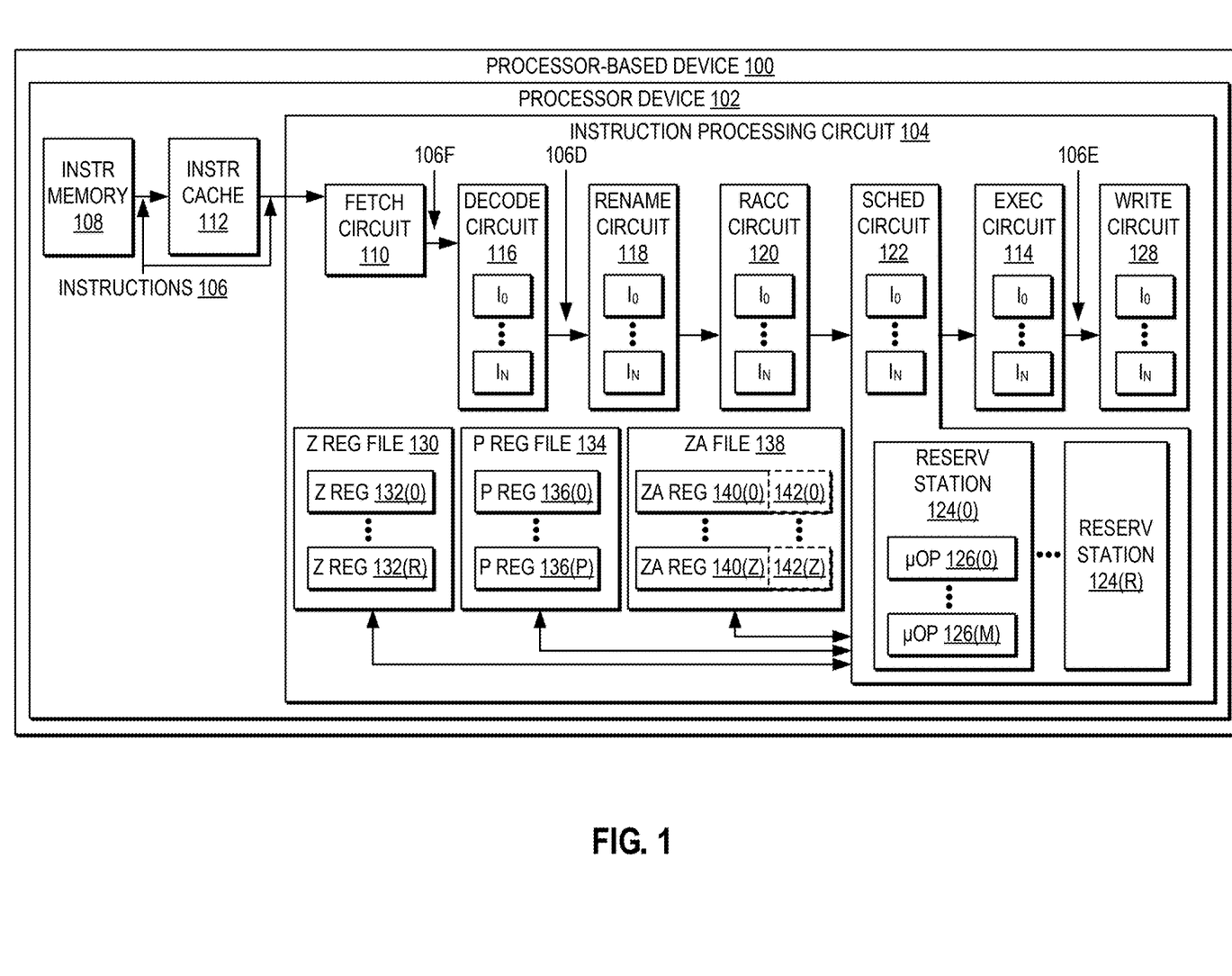
FIG. 1 is a diagram of an exemplary processor-based system that includes a processor device with an instruction processing circuit comprising reservation stations configured to enable high-performance Scalable Matrix Extension (SME) instruction issue, according to some aspects.

In this regard, FIG. 1 is a diagram of an exemplary processor-based device 100 that includes a processor device 102. The processor device 102, which also may be referred to as a "processor core" or a "central processing unit (CPU) core," may be an in-order or an out-of-order processor (OoP), and/or may be one of a plurality of processor devices 102 provided by the processor-based device 100. In the example of FIG. 1, the processor device 102 includes an instruction processing circuit 104 that comprises one or more instruction pipelines $I_0$-$I_N$ for processing instructions 106 fetched from an instruction memory (captioned as "INSTR MEMORY" in FIG. 1) 108 by a fetch circuit 110 for execution. The instruction memory 108 may be provided in or as part of a system memory in the processor-based device 100, as a non-limiting example. An instruction cache (captioned as "INSTR CACHE" in FIG. 1) 112 may also be provided in the processor device 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned as "EXEC CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 116 configured to decode the fetched instructions 106F fetched by the fetch circuit 110 into decoded instructions 106D to determine the instruction type and actions required. The decoded instructions 106D each may comprise, e.g., one or more micro-ops into which corresponding fetched instructions 106F are decomposed. As used herein, a "micro-op" refers to a low-level instruction that implements part or all of the functionality of "macro" instructions such as the instructions 106. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 118 in the instruction processing circuit 104. The rename circuit 118 is configured to determine if any register names in the decoded instructions 106D should be renamed to decouple any register dependencies that would prevent parallel or out-of-order processing.

The instruction processing circuit 104 in the processor device 102 in FIG. 1 also includes a register access circuit (captioned as "RACC CIRCUIT" in FIG. 1) 120. The register access circuit 120 is configured to access physical registers (not shown) in a physical register file (PRF) (not shown). Each of the physical registers has a corresponding physical register number (not shown) that can be mapped to a logical register number using, e.g., mapping entries of a register mapping table (RMT) (not shown). In this manner, the register access circuit 120 can access a source register operand of a decoded instruction 106D to retrieve a produced value from an executed instruction 106E in the execution circuit 114. The register access circuit 120 is also configured to provide the retrieved produced value from an executed instruction 106E as the source register operand of a decoded instruction 106D to be executed.

The instruction processing circuit 104 further includes a scheduler circuit (captioned as "SCHED CIRCUIT" in FIG. 1) 122 in the instruction pipeline $I_0$-$I_N$. The scheduler circuit 122 comprises a plurality of reservation station circuits (captioned as "RESERV STATION" in FIG. 1) 124(0)-124(R), each which is configured to store micro-ops (captioned as "µOP" in FIG. 1) 126(0)-126(M), into which the decoded instructions 106D have been decoded, until all source register operands for each of the micro-ops 126(0)-126(M) are available. The scheduler circuit 122 issues the micro-ops 126(0)-126(M) that are ready to be executed to the execution circuit 114. A write circuit 128 is also provided in the instruction processing circuit 104 to write back or commit produced values from executed instructions 106E to memory, cache memory, or system memory.

In the example of FIG. 1, the processor device 102 is configured to implement the SME1 and SME version 2 (SME2) extensions to the ARM architecture. Accordingly, the processor device 102 provides a Z register file (captioned as "Z REG FILE" in FIG. 1) 130 comprising a plurality of Z registers (captioned as "Z REG" in FIG. 1) 132(0)-132(R). Each of the Z registers 132(0)-132(R) comprises a vector register that is configured to store vector data (e.g., rows or columns of matrices) for use in computations such as matrix operations. The processor device also includes a P register file (captioned as "P REG FILE" in FIG. 1) 134 that comprises a plurality of P registers (captioned as "P REG" in FIG. 1) 136(0)-136(P). The P registers 136(0)-136(P) are each configured to store predicate data allowing the processor device 102 to selectively perform operations on certain elements of data while ignoring others. This facilitates tasks such as matrix padding and handling of sparse data in matrices.

Additionally, the processor device 102 includes a ZA file 138 that comprises a plurality of ZA registers (captioned as "ZA REG" in FIG. 1) 140(0)-140(Z) and, in some aspects, a corresponding plurality of counters 142(0)-142(Z). Each of the ZA registers 140(0)-140(Z) serves as a special-purpose register configured to accelerate matrix-related operations such as matrix multiplication and addition. For example, the ZA registers 140(0)-140(Z) can be used to accumulate results from matrix multiplication operations. The ZA registers 140(0)-140(Z) are larger in size relative to the Z registers 132(0)-132(R) and the P registers 136(0)-136(P), and are more numerous than the Z registers 132(0)-132(R) and the P registers 136(0)-136(P) (i.e., Z>R and Z>P). In some aspects, the ZA registers 140(0)-140(Z) are associated with corresponding counters 142(0)-142(Z), which may be used to determine whether the ZA registers 140(0)-140(Z) are ready (i.e., whether they have received data on which the micro-ops 126(0)-126(M) depend). For example, a counter of the counters 142(0)-142(Z) may be initialized with a number of processor cycles that a matrix operation performed using the corresponding ZA register of the ZA registers 140(0)-140(Z) will consume, and may be decremented on each subsequent processor cycle. When the counter value reaches zero (0), the corresponding ZA register can be determined to be ready.

As noted above, conventional processor devices may perform renaming of the Z registers 132(0)-132(R) and the P registers 136(0)-136(P), which can allow the micro-ops 126(0)-126(M) that depend on the Z registers 132(0)-132(R) and the P registers 136(0)-136(P) to be issued out-of-order by the reservation station circuit 124(0) for execution. However, renaming of the ZA registers 140(0)-140(Z) is generally not feasible both because of area constraints, and also due to the difficulty in associating instruction execution results with particular ZA registers 140(0)-140(Z). Moreover, it may be impractical to examine every one of the ZA registers 140(0)-140(Z) to detect and resolve RAW hazards on the ZA registers 140(0)-140(Z).

In this regard, the processor device 102 is configured to enable high-performance SME instruction issue by allowing out-of-order issuing of selected ones of the micro-ops 126(0)-126(M) if the corresponding Z registers 132(0)-132(R) and the corresponding P registers 136(0)-136(P) are ready and there exists no RAW hazard on the ZA registers 140(0)-140(Z). In exemplary operation, a reservation station, such as the reservation station circuit 124(0), performs a series of operations during a first phase. The reservation station circuit 124(0) performs a reduced-precision ZA tracking operation on each of the micro-ops 126(0)-126(M) stored by the reservation station circuit 124(0) for which corresponding Z registers 132(0)-132(R) and corresponding P registers 136(0)-136(P) are ready (i.e., store data to be consumed by a dependent micro-op 126(0)-126(M)). Assume for purposes of illustration that the micro-op 126(0) depends on the Z register 132(0) and the P register 136(0), while the micro-op 126(M) depends on the Z register 132(R) and the P register 136(P).

The reduced-precision ZA tracking operation comprises operations to check for RAW hazards involving the ZA registers 140(0)-140(Z) at a less precise level than, e.g., performing a check on every one of the ZA registers 140(0)-140(Z). In some aspects, for example, the operations for performing the reduced-precision ZA tracking operation may comprise the reservation station circuit 124(0) determining whether each of the micro-ops 126(0)-126(M) corresponds to an SME1 access pattern to access the ZA registers 140(0)-140(Z). In particular, because the ARM instruction set architecture (ISA) for SME1 groups the ZA registers 140(0)-140(Z) into double-word (i.e., 64-bit) tiles, SME1 arithmetic micro-ops always access the ZA registers 140(0)-140(Z) in one (1) of eight (8) access patterns. For example, an SME1 tile zero (0) access pattern would access the ZA register 132(0), the ZA register 132(8), the ZA register 132(16), the ZA register 132(24), the ZA register 132(32), the ZA register 132(40), the ZA register 132(48), and the ZA register 132(56), while an SME1 tile one (1) access pattern would access the ZA register 132(1), the ZA register 132(9), the ZA register 132(17), the ZA register 132(25), the ZA register 132(33), the ZA register 132(41), the ZA register 132(49), the ZA register 132(57), and so forth in similar fashion.

The reservation station circuit 124(0) then selects, based on the reduced-precision ZA tracking operation, a first micro-op (e.g., the micro-op 126(0)) and a second micro-op (e.g., the micro-op 126(M)) for which the reduced-precision ZA tracking operation indicates no RAW hazard exists with respect to the ZA registers 140(0), 140(Z). Some aspects may provide that the operations for selecting the first micro-op 126(0) and the second micro-op 126(M) may comprise the reservation station circuit 124(0) selecting an oldest micro-op (e.g., the micro-op 126(0)) for which a first Z register (e.g., the Z register 132(0)) of the plurality of Z registers 132(0)-132(R) and a first P register (e.g., the P register 136(0)) of the plurality of P registers 136(0)-136(P) are ready as the first micro-op 126(0). The reservation station circuit 124(0) also selects a youngest micro-op (e.g., the micro-op 126(M)) for which a second Z register (e.g., the Z register 132(R)) of the plurality of Z registers 132(0)-132(R) and a second P register (e.g., the P register 136(P)) of the plurality of P registers 136(0)-136(P) are ready as the second micro-op 126(M).

The reservation station circuit 124(0) next performs a series of operations during a subsequent second phase. The reservation station circuit 124(0) performs a full-precision ZA tracking operation on each of the first micro-op 126(0) and the second micro-op 126(M). The full-precision ZA tracking operation comprises a check of RAW hazards with respect to the ZA registers 140(0)-140(Z) that is more complete and more accurate than the reduced-precision ZA tracking operation performed during the first phase. According to some aspects, the operations for performing the full-precision ZA tracking operation may comprise the reservation station circuit 124(0) determining whether each ZA register of the plurality of ZA registers 140(0)-140(Z) is ready (e.g., based on the counters 142(0)-142(Z)).

The reservation station circuit 124(0) then selects, based on the full-precision ZA tracking operation, one of the first micro-op 126(0) and the second micro-op 126(M) as a micro-op for issue (the micro-op 126(0), in this example) for which the full-precision ZA tracking operation indicates no RAW hazard exists with respect to the ZA registers 140(0), 140(Z). The reservation station circuit 124(0) issues the micro-op for issue 126(0) to the execution circuit 114 of the instruction processing circuit 104 for execution. In some aspects, the reservation station circuit 124(0), subsequent to issuing the micro-op for issue 126(0) to the execution circuit 114 for execution, may update a counter (e.g., a counter 142(0)) of the plurality of counters 142(0)-142(Z). In some aspects, if a RAW hazard is determined to exist with respect to one or both of the first micro-op 126(0) and the second micro-op 126(M), the affected micro-op may be stalled in the reservation station 124(0).

Figure 2A:
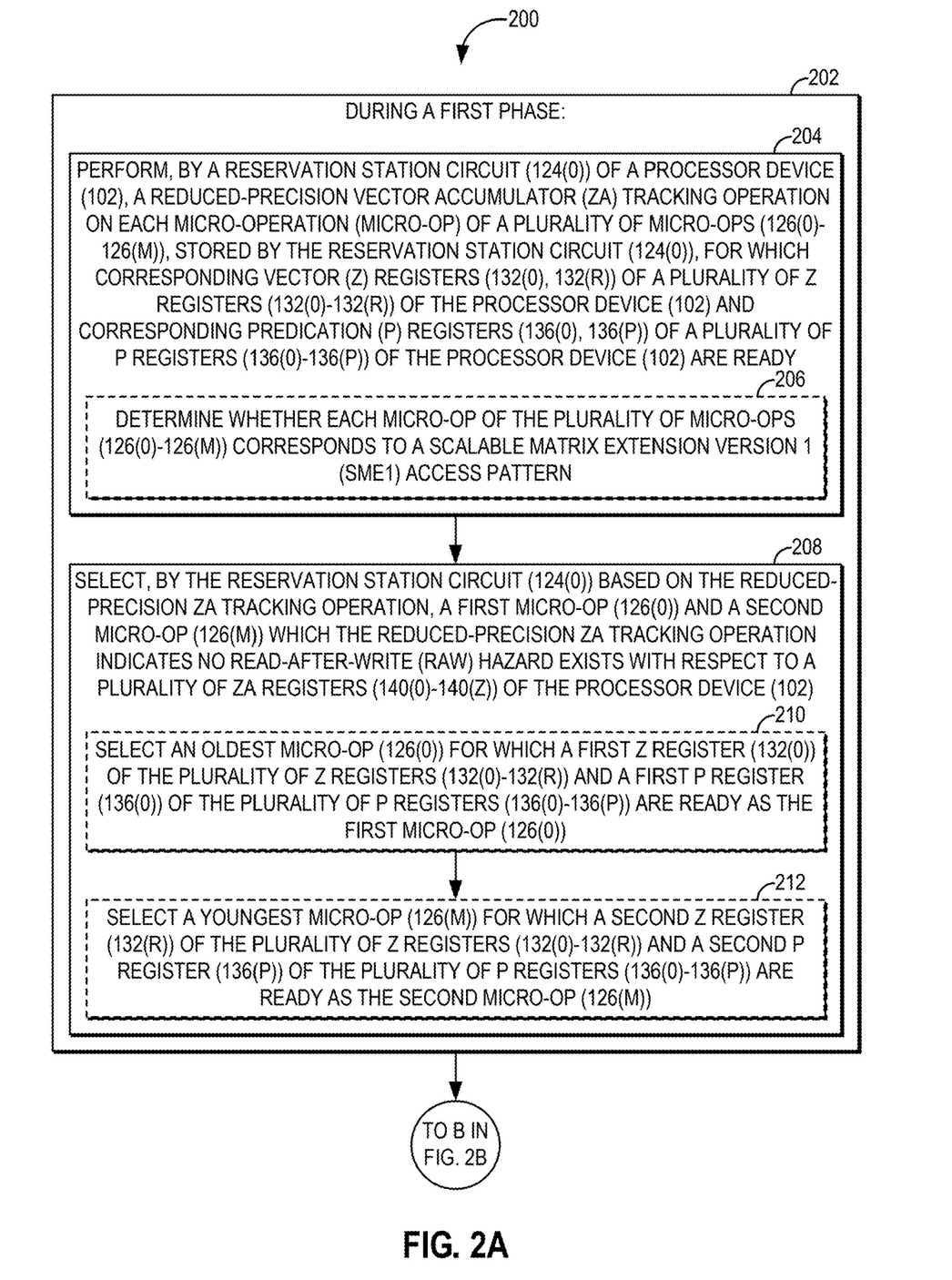
FIGS. 2A-2B are flowcharts illustrating exemplary operations performed by the processor device of FIG. 1 for enabling high-performance SME instruction issue, according to some aspects.
Figure 2B:
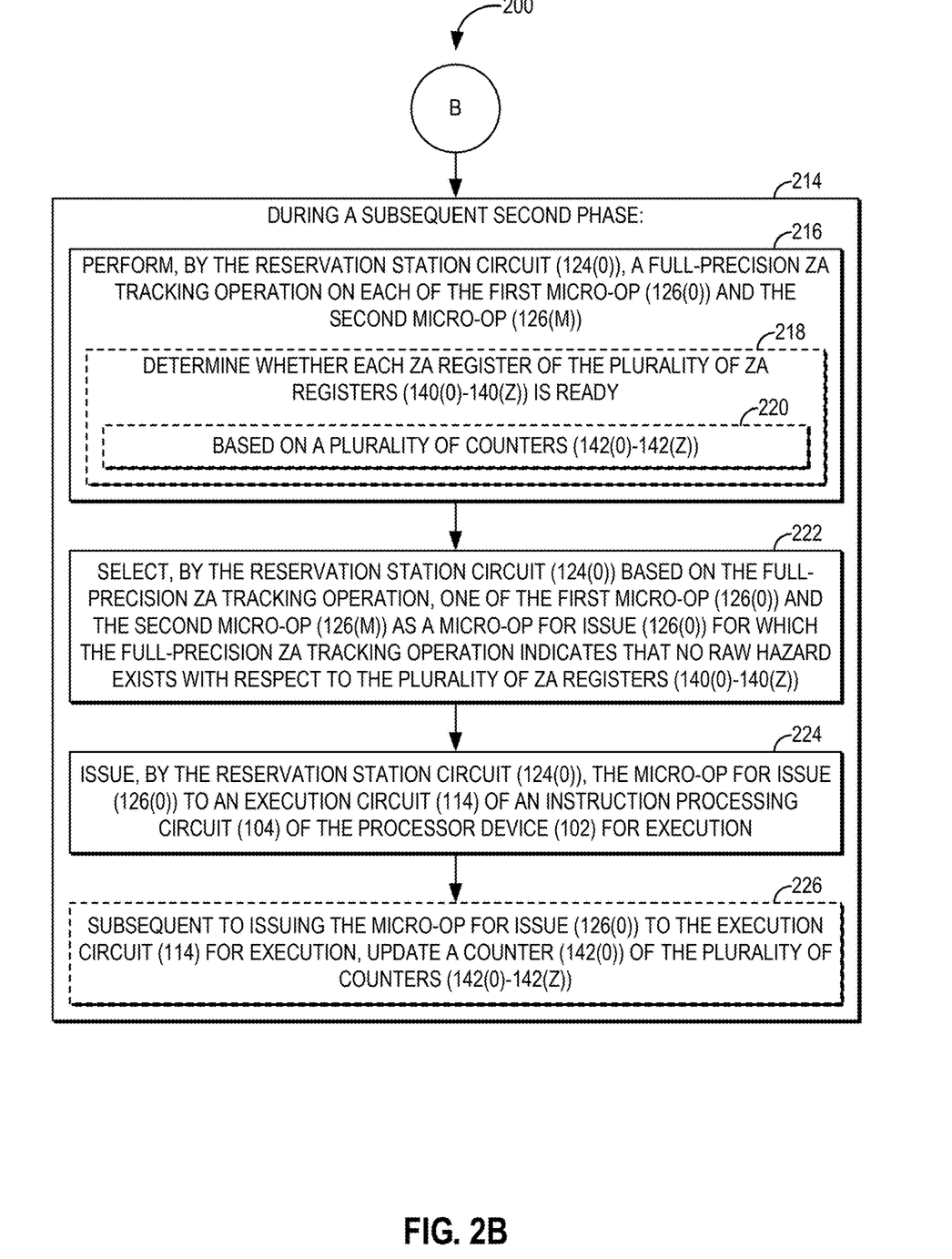

To illustrate operations performed by the processor device 102 of FIG. 1 for enabling high-performance SME instruction issue according to some aspects, FIGS. 2A-2B provide a flowchart showing exemplary operations 200. For the sake of clarity, elements of FIG. 1 are referenced in describing FIGS. 2A-2B. It is to be understood that some aspects may provide that some operations illustrated in FIGS. 2A-2B may be performed in an order other than that illustrated herein, and/or may be omitted.

The exemplary operations 200 begin in FIG. 2A with a reservation station (e.g., the reservation station circuit 124(0) of FIG. 1) of a processor device (such as the processor device 102 of FIG. 1) performing a series of operations during a first phase (block 202). The reservation station circuit 124(0) performs a reduced-precision ZA tracking operation on each micro-op of a plurality of micro-ops (e.g., the micro-ops 126(0)-126(M) of FIG. 1), stored by the reservation station circuit 124(0), for which corresponding Z registers (such as the Z registers 132(0), 132(R) of FIG. 1) of a plurality of Z registers (e.g., the Z registers 132(0)-132(R) of FIG. 1) of the processor device 102 and corresponding P registers (such as the P registers 136(0), 136(P) of FIG. 1) of a plurality of P registers (e.g., the P registers 136(0)-136(P) of FIG. 1) of the processor device 102 are ready (block 204). In some aspects, the operations of block 204 for performing the reduced-precision ZA tracking operation may comprise the reservation station circuit 124(0) determine whether each micro-op of the plurality of micro-ops 126(0)-126(M) corresponds to an SME1 access pattern (block 206).

The reservation station circuit 124(0) then selects, based on the reduced-precision ZA tracking operation, a first micro-op (such as the micro-op 126(0) of FIG. 1) and a second micro-op (e.g., the micro-op 126(M) of FIG. 1) for which the reduced-precision ZA tracking operation indicates that no RAW hazard exists with respect to a plurality of ZA registers (e.g., the ZA registers 140(0)-140(Z) of FIG. 1) of the processor device 102 (block 208). Some aspects may provide that the operations of block 208 for selecting the first micro-op 126(0) and the second micro-op 126(M) may comprise the reservation station circuit 124(0) selecting an oldest micro-op (e.g., the micro-op 126(0) of FIG. 1) for which a first Z register (such as the Z register 132(0) of FIG. 1) of the plurality of Z registers 132(0)-132(R) and a first P register (such as the P register 136(0) of FIG. 1) of the plurality of P registers 136(0)-136(P) are ready as the first micro-op 126(0) (block 210). The reservation station circuit 124(0) also selects a youngest micro-op (e.g., the micro-op 126(M) of FIG. 1) for which a second Z register (such as the Z register 132(R) of FIG. 1) of the plurality of Z registers 132(0)-132(R) and a second P register (e.g., the P register 136(P) of FIG. 1) of the plurality of P registers 136(0)-136(P) are ready as the second micro-op 126(M) (block 212). The exemplary operations 200 then continue at block 214 of FIG. 2B.

Turning now to FIG. 2B, the reservation station circuit 124(0) next performs a series of operations during a subsequent second phase (block 214). The reservation station circuit 124(0) performs a full-precision ZA tracking operation on each of the first micro-op 126(0) and the second micro-op 126(M) (block 216). According to some aspects, the operations of block 216 for performing the full-precision ZA tracking operation may comprise the reservation station circuit 124(0) determining whether each ZA register of the plurality of ZA registers 140(0)-140(Z) is ready (block 218). Some such aspects may provide that the operations of block 218 for determining whether each ZA register of the plurality of ZA registers 140(0)-140(Z) is ready is based on a plurality of counters (such as the counters 142(0)-142(Z) of FIG. 1) (block 220).

The reservation station circuit 124(0) then selects, based on the full-precision ZA tracking operation, one of the first micro-op 126(0) and the second micro-op 126(M) as a micro-op for issue (e.g., the micro-op 126(0) of FIG. 1) for which the full-precision ZA tracking operation indicates that no RAW hazard exists with respect to the plurality of ZA registers 140(0)-140(Z) (block 222). The reservation station circuit 124(0) issues the micro-op for issue 126(0) to an execution circuit (such as the execution circuit 114 of FIG. 1) of an instruction processing circuit (e.g., the instruction processing circuit 104 of FIG. 1) of the processor device 102 for execution (block 224). In some aspects, the reservation station circuit 124(0), subsequent to issuing the micro-op for issue 126(0) to the execution circuit 114 for execution, may update a counter (such as the counter 142(0) of FIG. 1) of the plurality of counters 142(0)-142(Z) (block 226).

The processor device according to aspects disclosed herein and discussed with reference to FIGS. 1 and 2A-2B may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 3:
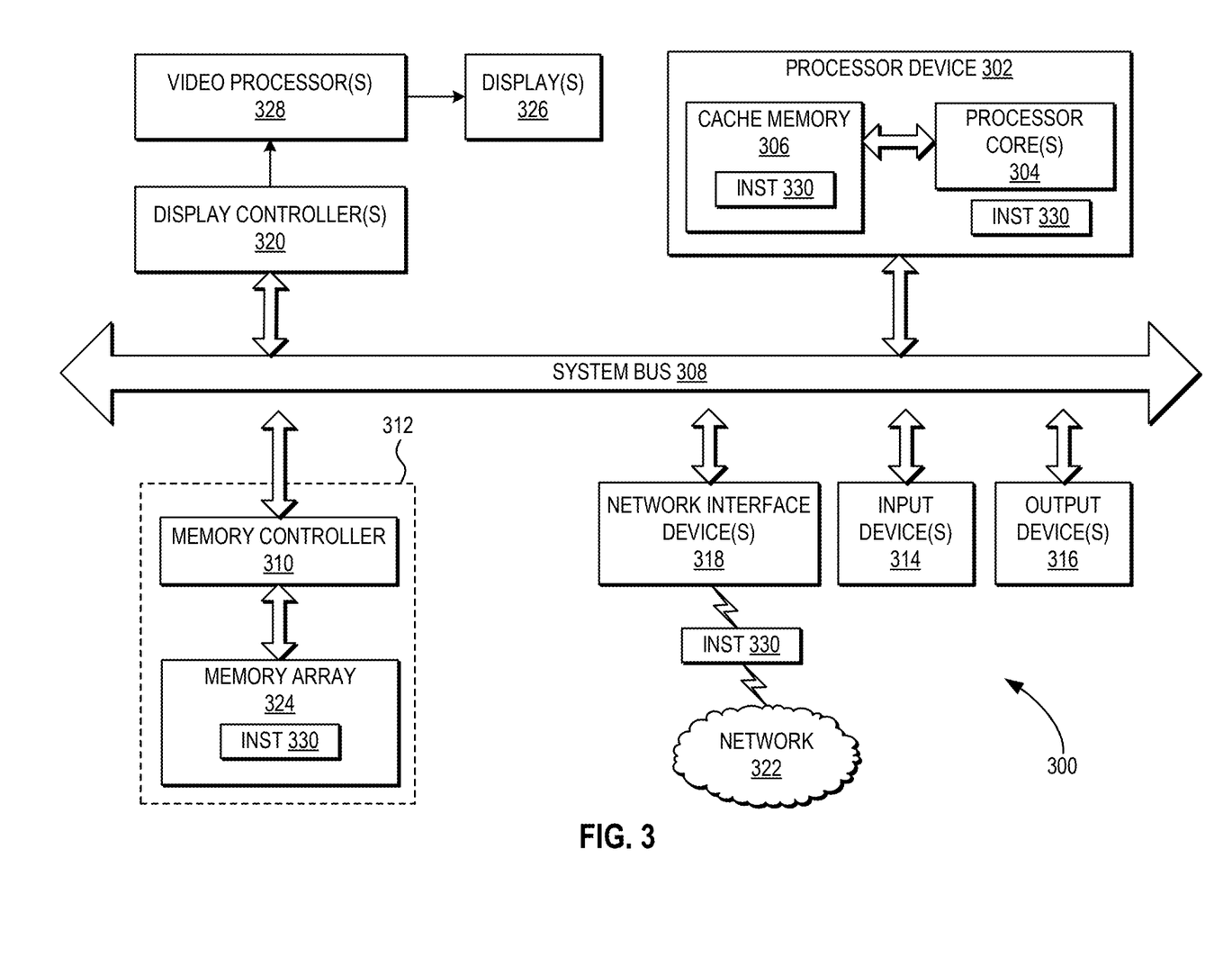
FIG. 3 is a block diagram of an exemplary processor-based device that can include the processor device of FIG. 1.

In this regard, FIG. 3 illustrates an example of a processor-based device 300, which corresponds in functionality to the processor-based device 100 of FIG. 1. In this example, the processor-based device 300 includes a processor device 302 (corresponding to the processor device 102 of FIG. 1) that comprises one or more processor cores 304 coupled to a cache memory 306. The processor device 302 is also coupled to a system bus 308 and can intercouple devices included in the processor-based device 300. As is well known, the processor device 302 communicates with these other devices by exchanging address, control, and data information over the system bus 308. For example, the processor device 302 can communicate bus transaction requests to a memory controller 310. Although not illustrated in FIG. 3, multiple system buses 308 could be provided, wherein each system bus 308 constitutes a different fabric.

Other devices may be connected to the system bus 308. As illustrated in FIG. 3, these devices can include a memory system 312, one or more input devices 314, one or more output devices 316, one or more network interface devices 318, and one or more display controllers 320, as examples. The input device(s) 314 can include any type of input device, including, but not limited to, input keys, switches, voice processors, etc. The output device(s) 316 can include any type of output device, including, but not limited to, audio, video, other visual indicators, etc. The network interface device(s) 318 can be any devices configured to allow exchange of data to and from a network 322. The network 322 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 318 can be configured to support any type of communications protocol desired. The memory system 312 can include the memory controller 310 coupled to one or more memory arrays 324.

The processor device 302 may also be configured to access the display controller(s) 320 over the system bus 308 to control information sent to one or more displays 326. The display controller(s) 320 sends information to the display(s) 326 to be displayed via one or more video processors 328, which process the information to be displayed into a format suitable for the display(s) 326. The display(s) 326 can include any type of display, including, but not limited to, a cathode ray tube (CRT), a liquid crystal display (LCD), a plasma display, a light emitting diode (LED) display, etc.

The processor-based device 300 in FIG. 3 may include a set of instructions (captioned as "INST" in FIG. 3) 330 that may be executed by the processor device 302 for any application desired according to the instructions. The instructions 330 may be stored in the memory system 312, the processor device 302, and/or the cache memory 306, each of which may comprise an example of a non-transitory computer-readable medium. The instructions 330 may also reside, completely or at least partially, within the memory system 312 and/or within the processor device 302 during their execution. The instructions 330 may further be transmitted or received over the network 322, such that the network 322 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 330. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
    an instruction processing circuit, comprising:
        an execution circuit; and
        a plurality of reservation station circuits each configured to store a corresponding plurality of micro-operations (micro-ops);
    a plurality of vector (Z) registers;
    a plurality of predicate (P) registers; and
    a vector accumulator (ZA) comprising a plurality of ZA registers;
    each reservation station circuit of the plurality of reservation station circuits configured to:
        during a first phase:
            perform a reduced-precision ZA tracking operation on each micro-op of the plurality of micro-ops for which corresponding Z registers of the plurality of Z registers and corresponding P registers of the plurality of P registers are ready; and
            select, based on the reduced-precision ZA tracking operation, a first micro-op and a second micro-op for which the reduced-precision ZA tracking operation indicates no Read-After-Write (RAW) hazard exists with respect to the plurality of ZA registers; and
        during a subsequent second phase:
            perform a full-precision ZA tracking operation on each of the first micro-op and the second micro-op;
            select, based on the full-precision ZA tracking operation, one of the first micro-op and the second micro-op as a micro-op for issue for which the full-precision ZA tracking operation indicates no RAW hazard exists with respect to the plurality of ZA registers; and
            issue the micro-op for issue to an execution circuit of the instruction processing circuit for execution.
2. The processor device of clause 1, wherein each reservation station circuit is configured to perform the reduced-precision ZA tracking operation by being configured to determine whether each micro-op of the plurality of micro-ops corresponds to a Scalable Matrix Extension 1 (SME1) access pattern.
3. The processor device of any one of clauses 1-2, wherein each reservation station circuit is configured to perform the full-precision ZA tracking operation by being configured to determine whether each ZA register of the plurality of ZA registers is ready.
4. The processor device of any one of clauses 1-3, wherein each reservation station circuit is configured to select the first micro-op and the second micro-op by being configured to:
    select an oldest micro-op for which a first Z register of the plurality of Z registers and a first P register of the plurality of P registers are ready as the first micro-op; and
    select a youngest micro-op for which a second Z register of the plurality of Z registers and a second P register of the plurality of P registers are ready as the second micro-op.
5. The processor device of any one of clauses 1-4, wherein:
    each ZA register of the plurality of ZA registers corresponds to a counter of a plurality of counters; and
    each reservation station circuit is configured to perform the full-precision ZA tracking operation on each of the first micro-op and the second micro-op based on the plurality of counters.
6. The processor device of clause 5, wherein each reservation station circuit is further configured to, subsequent to issuing the micro-op for issue to the execution circuit for execution, update a counter of the plurality of counters.
7. The processor device of any one of clauses 1-6, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
8. A processor device, comprising:
    means for performing, during a first phase, a reduced-precision vector accumulator (ZA) tracking operation on each micro-operation (micro-op) of a plurality of micro-ops, stored by a reservation station circuit of the processor device, for which corresponding vector (Z) registers of a plurality of Z registers of the processor device and corresponding predicate (P) registers of a plurality of P registers of the processor device are ready;
    means for selecting, during the first phase based on the reduced-precision ZA tracking operation, a first micro-op and a second micro-op for which the reduced-precision ZA tracking operation indicates no Read-After-Write (RAW) hazard exists with respect to a plurality of ZA registers of the processor device;
    means for performing, during a subsequent second phase, a full-precision ZA tracking operation on each of the first micro-op and the second micro-op;
    means for selecting, during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers; and means for issuing, during the subsequent second phase, the micro-op for issue to an execution circuit of an instruction processing circuit of the processor device for execution.

9. A method for enabling high-performance Scalable Matrix Extension (SME) instruction issue, comprising:
during a first phase:
performing, by a reservation station circuit of a processor device, a reduced-precision vector accumulator (ZA) tracking operation on each micro-operation (micro-op) of a plurality of micro-ops, stored by the reservation station circuit, for which corresponding vector (Z) registers of a plurality of Z registers of the processor device and corresponding predicate (P) registers of a plurality of P registers of the processor device are ready; and
selecting, by the reservation station circuit based on the reduced-precision ZA tracking operation, a first micro-op and a second micro-op for which the reduced-precision ZA tracking operation indicates no Read-After-Write (RAW) hazard exists with respect to a plurality of ZA registers of the processor device; and
during a subsequent second phase:
performing, by the reservation station circuit, a full-precision ZA tracking operation on each of the first micro-op and the second micro-op;
selecting, by the reservation station circuit based on the full-precision ZA tracking operation, one of the first micro-op and the second micro-op as a micro-op for issue for which the full-precision ZA tracking operation indicates no RAW hazard exists with respect to the plurality of ZA registers; and
issuing, by the reservation station circuit, the micro-op for issue to an execution circuit of an instruction processing circuit of the processor device for execution.

10. The method of clause 9, wherein performing the reduced-precision ZA tracking operation comprises determining whether each micro-op of the plurality of micro-ops corresponds to a Scalable Matrix Extension 9 (SME1) access pattern.

11. The method of any one of clauses 9-10, wherein performing the full-precision ZA tracking operation comprises determining whether each ZA register of the plurality of ZA registers is ready.

12. The method of any one of clauses 9-11, wherein selecting the first micro-op and the second micro-op comprises:
selecting an oldest micro-op for which a first Z register of the plurality of Z registers and a first P register of the plurality of P registers are ready as the first micro-op; and
selecting a youngest micro-op for which a second Z register of the plurality of Z registers and a second P register of the plurality of P registers are ready as the second micro-op.

13. The method of any one of clauses 9-12, wherein:
each ZA register of the plurality of ZA registers corresponds to a counter of a plurality of counters; and
performing the full-precision ZA tracking operation on each of the first micro-op and the second micro-op is based on the plurality of counters.

14. The method of clause 13, further comprising, subsequent to issuing the micro-op for issue to the execution circuit for execution, updating a counter of the plurality of counters.

15. A non-transitory computer-readable medium, having stored thereon computer-executable instructions that, when executed by a processor device, cause a dependency identifier circuit of the processor device to:
during a first phase:
perform a reduced-precision vector accumulator (ZA) tracking operation on each micro-operation (micro-op) of a plurality of micro-ops, stored in a reservation station circuit of the processor device, for which corresponding vector (Z) registers of a plurality of Z registers of the processor device and corresponding predicate (P) registers of a plurality of P registers of the processor device are ready; and
select, based on the reduced-precision ZA tracking operation, a first micro-op and a second micro-op for which the reduced-precision ZA tracking operation indicates no Read-After-Write (RAW) hazard exists with respect to a plurality of ZA registers of the processor device; and
during a subsequent second phase:
perform a full-precision ZA tracking operation on each of the first micro-op and the second micro-op;
select, based on the full-precision ZA tracking operation, one of the first micro-op and the second micro-op as a micro-op for issue for which the full-precision ZA tracking operation indicates no RAW hazard exists with respect to the plurality of ZA registers; and
issue the micro-op for issue to an execution circuit of an instruction processing circuit of the processor device for execution.

16. The non-transitory computer-readable medium of clause 15, wherein the computer-executable instructions cause the processor device to perform the reduced-precision ZA tracking operation by causing the processor device to determine whether each micro-op of the plurality of micro-ops corresponds to a Scalable Matrix Extension 15 (SME1) access pattern.

17. The non-transitory computer-readable medium of any one of clauses 15-16, wherein the computer-executable instructions cause the processor device to perform the full-precision ZA tracking operation by causing the processor device to determine whether each ZA register of the plurality of ZA registers is ready.

18. The non-transitory computer-readable medium of any one of clauses 15-17, wherein the computer-executable instructions cause the processor device to select the first micro-op and the second micro-op by causing the processor device to:
select an oldest micro-op for which a first Z register of the plurality of Z registers and a first P register of the plurality of P registers are ready as the first micro-op; and
select a youngest micro-op for which a second Z register of the plurality of Z registers and a second P register of the plurality of P registers are ready as the second micro-op.

19. The non-transitory computer-readable medium of any one of clauses 15-18, wherein:
each ZA register of the plurality of ZA registers corresponds to a counter of a plurality of counters; and the computer-executable instructions cause the processor device to perform the full-precision ZA tracking operation on each of the first micro-op and the second micro-op based on the plurality of counters.

20. The non-transitory computer-readable medium of clause 19, wherein the computer-executable instructions further cause the processor device to, subsequent to issuing the micro-op for issue to the execution circuit for execution, update a counter of the plurality of counters.

What is claimed is:

1. A processor device, comprising:
an instruction processing circuit, comprising:
   an execution circuit; and
   a plurality of reservation station circuits each configured to store a corresponding plurality of micro-operations (micro-ops);
a plurality of vector (Z) registers;
a plurality of predicate (P) registers; and
a vector accumulator (ZA) comprising a plurality of ZA registers;
each reservation station circuit of the plurality of reservation station circuits configured to:
   during a first phase:
      perform a reduced-precision ZA tracking operation on each micro-op of the plurality of micro-ops for which corresponding Z registers of the plurality of Z registers and corresponding P registers of the plurality of P registers are ready; and
      select, based on the reduced-precision ZA tracking operation, a first micro-op and a second micro-op for which the reduced-precision ZA tracking operation indicates no Read-After-Write (RAW) hazard exists with respect to the plurality of ZA registers; and
   during a subsequent second phase:
      perform a full-precision ZA tracking operation on each of the first micro-op and the second micro-op;
      select, based on the full-precision ZA tracking operation, one of the first micro-op and the second micro-op as a micro-op for issue for which the full-precision ZA tracking operation indicates no RAW hazard exists with respect to the plurality of ZA registers; and
      issue the micro-op for issue to an execution circuit of the instruction processing circuit for execution.

2. The processor device of claim 1, wherein each reservation station circuit is configured to perform the reduced-precision ZA tracking operation by being configured to determine whether each micro-op of the plurality of micro-ops corresponds to a Scalable Matrix Extension 1 (SME1) access pattern.

3. The processor device of claim 1, wherein each reservation station circuit is configured to perform the full-precision ZA tracking operation by being configured to determine whether each ZA register of the plurality of ZA registers is ready.

4. The processor device of claim 1, wherein each reservation station circuit is configured to select the first micro-op and the second micro-op by being configured to:
select an oldest micro-op for which a first Z register of the plurality of Z registers and a first P register of the plurality of P registers are ready as the first micro-op; and select a youngest micro-op for which a second Z register of the plurality of Z registers and a second P register of the plurality of P registers are ready as the second micro-op.

5. The processor device of claim 1, wherein:
each ZA register of the plurality of ZA registers corresponds to a counter of a plurality of counters; and
each reservation station circuit is configured to perform the full-precision ZA tracking operation on each of the first micro-op and the second micro-op based on the plurality of counters.

6. The processor device of claim 5, wherein each reservation station circuit is further configured to, subsequent to issuing the micro-op for issue to the execution circuit for execution, update a counter of the plurality of counters.

7. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

8. A processor device, comprising:
means for performing, during a first phase, a reduced-precision vector accumulator (ZA) tracking operation on each micro-operation (micro-op) of a plurality of micro-ops, stored by a reservation station circuit of the processor device, for which corresponding vector (Z) registers of a plurality of Z registers of the processor device and corresponding predicate (P) registers of a plurality of P registers of the processor device are ready;
means for selecting, during the first phase based on the reduced-precision ZA tracking operation, a first micro-op and a second micro-op for which the reduced-precision ZA tracking operation indicates no Read-After-Write (RAW) hazard exists with respect to a plurality of ZA registers of the processor device;
means for performing, during a subsequent second phase, a full-precision ZA tracking operation on each of the first micro-op and the second micro-op;
means for selecting, during the subsequent second phase based on the full-precision ZA tracking operation, one of the first micro-op and the second micro-op as a micro-op for issue for which the full-precision ZA tracking operation indicates no RAW hazard exists with respect to the plurality of ZA registers; and
means for issuing, during the subsequent second phase, the micro-op for issue to an execution circuit of an instruction processing circuit of the processor device for execution.

9. A method for enabling Scalable Matrix Extension (SME) instruction issue, comprising:
during a first phase:
   performing, by a reservation station circuit of a processor device, a reduced-precision vector accumulator (ZA) tracking operation on each micro-operation (micro-op) of a plurality of micro-ops, stored by the reservation station circuit, for which corresponding vector (Z) registers of a plurality of Z registers of the processor device and corresponding predicate (P) registers of a plurality of P registers of the processor device are ready; and selecting, by the reservation station circuit based on the reduced-precision ZA tracking operation, a first micro-op and a second micro-op for which the reduced-precision ZA tracking operation indicates no Read-After-Write (RAW) hazard exists with respect to a plurality of ZA registers of the processor device; and during a subsequent second phase:

performing, by the reservation station circuit, a full-precision ZA tracking operation on each of the first micro-op and the second micro-op;

selecting, by the reservation station circuit based on the full-precision ZA tracking operation, one of the first micro-op and the second micro-op as a micro-op for issue for which the full-precision ZA tracking operation indicates no RAW hazard exists with respect to the plurality of ZA registers; and issuing, by the reservation station circuit, the micro-op for issue to an execution circuit of an instruction processing circuit of the processor device for execution.

10. The method of claim 9, wherein performing the reduced-precision ZA tracking operation comprises determining whether each micro-op of the plurality of micro-ops corresponds to a Scalable Matrix Extension 1 (SME1) access pattern.

11. The method of claim 9, wherein performing the full-precision ZA tracking operation comprises determining whether each ZA register of the plurality of ZA registers is ready.

12. The method of claim 9, wherein selecting the first micro-op and the second micro-op comprises:

selecting an oldest micro-op for which a first Z register of the plurality of Z registers and a first P register of the plurality of P registers are ready as the first micro-op; and selecting a youngest micro-op for which a second Z register of the plurality of Z registers and a second P register of the plurality of P registers are ready as the second micro-op.

13. The method of claim 9, wherein:

each ZA register of the plurality of ZA registers corresponds to a counter of a plurality of counters; and performing the full-precision ZA tracking operation on each of the first micro-op and the second micro-op is based on the plurality of counters.

14. The method of claim 13, further comprising, subsequent to issuing the micro-op for issue to the execution circuit for execution, updating a counter of the plurality of counters.

15. A non-transitory computer-readable medium, having stored thereon computer-executable instructions that, when executed by a processor device, cause a dependency identifier circuit of the processor device to:

during a first phase:

perform a reduced-precision vector accumulator (ZA) tracking operation on each micro-operation (micro-op) of a plurality of micro-ops, stored in a reservation station circuit of the processor device, for which corresponding vector (Z) registers of a plurality of Z registers of the processor device and corresponding predicate (P) registers of a plurality of P registers of the processor device are ready; and select, based on the reduced-precision ZA tracking operation, a first micro-op and a second micro-op for which the reduced-precision ZA tracking operation indicates no Read-After-Write (RAW) hazard exists with respect to a plurality of ZA registers of the processor device; and during a subsequent second phase:

perform a full-precision ZA tracking operation on each of the first micro-op and the second micro-op;

select, based on the full-precision ZA tracking operation, one of the first micro-op and the second micro-op as a micro-op for issue for which the full-precision ZA tracking operation indicates no RAW hazard exists with respect to the plurality of ZA registers; and issue the micro-op for issue to an execution circuit of an instruction processing circuit of the processor device for execution.

16. The non-transitory computer-readable medium of claim 15, wherein the computer-executable instructions cause the processor device to perform the reduced-precision ZA tracking operation by causing the processor device to determine whether each micro-op of the plurality of micro-ops corresponds to a Scalable Matrix Extension 1 (SME1) access pattern.

17. The non-transitory computer-readable medium of claim 15, wherein the computer-executable instructions cause the processor device to perform the full-precision ZA tracking operation by causing the processor device to determine whether each ZA register of the plurality of ZA registers is ready.

18. The non-transitory computer-readable medium of claim 15, wherein the computer-executable instructions cause the processor device to select the first micro-op and the second micro-op by causing the processor device to:

select an oldest micro-op for which a first Z register of the plurality of Z registers and a first P register of the plurality of P registers are ready as the first micro-op; and select a youngest micro-op for which a second Z register of the plurality of Z registers and a second P register of the plurality of P registers are ready as the second micro-op.

19. The non-transitory computer-readable medium of claim 15, wherein:

each ZA register of the plurality of ZA registers corresponds to a counter of a plurality of counters; and the computer-executable instructions cause the processor device to perform the full-precision ZA tracking operation on each of the first micro-op and the second micro-op based on the plurality of counters.

20. The non-transitory computer-readable medium of claim 19, wherein the computer-executable instructions further cause the processor device to, subsequent to issuing the micro-op for issue to the execution circuit for execution, update a counter of the plurality of counters.

* * * * *